United States Patent [19]

Nikawitz

[11] 3,860,645
[45] Jan. 14, 1975

[54] BACTERIOSTATIC SUBSTITUTED CARBANILIDES

[75] Inventor: Edward Nikawitz, Glen Rock, N.J.

[73] Assignee: Givaudan Corporation, Clifton, N.J.

[22] Filed: May 23, 1973

[21] Appl. No.: 363,206

[52] U.S. Cl............... 260/553 C, 252/107, 424/322
[51] Int. Cl............................................ C07c 127/16
[58] Field of Search................................. 260/553 C

[56] References Cited
UNITED STATES PATENTS

| | | | |
|---|---|---|---|
| 2,745,874 | 5/1956 | Schetty | 260/553 C |
| 2,818,930 | 12/1957 | Beaver | 260/553 C |
| 2,846,398 | 8/1958 | Beaver | 260/553 C X |

Primary Examiner—Leon Zitver
Assistant Examiner—Michael W. Glynn
Attorney, Agent, or Firm—Thomas Cifelli, Jr.

[57] ABSTRACT

Substituted carbanilides useful as bacteriostatic agents, the carbanilides having the formula

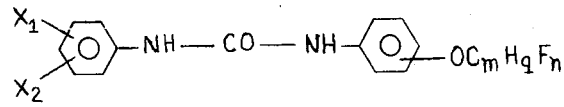

wherein $X_1$ and $X_2$ are selected from the group of Cl and H, at least one of $X_1$ and $X_2$ being Cl, $m$ is an integer from 1 to 3, $q$ is an integer from 0 to 5, $n$ is an integer from 2 to 7, and the positions ortho to the nitrogen atom in the phenyl moieties are unsubstituted.

7 Claims, No Drawings

BACTERIOSTATIC SUBSTITUTED CARBANILIDES

BACKGROUND OF THE INVENTION

This invention relates to new compositions of matter for inhibiting the growth of bacteria and more particularly to substituted carbanilides which exhibit bacteriostatic activity, especially when incorporated in formulations containing soaps or other surface active agents.

In accordance with the present invention, there is provided a substituted carbanilide exhibiting bacteriostatic activity, the polyfluoralkoxy carbanilide having the formula

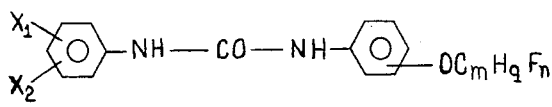

wherein $X_1$ and $X_2$ are selected from the group of Cl and H, at least one of $X_1$ and $X_2$ being Cl, $m$ is an integer from 1 to 3, $q$ is an integer from 0 to 5, $n$ is an integer from 2 to 7 and the positions ortho to the nitrogen atom in the phenyl moieties are unsubstituted.

The substituted carbanilides of the present invention possess unusually strong antimicrobial properties and in the presence of soap, exhibit a minimum inhibitory concentration range of 0.312–0.039 mcg/ml against *Staph, aureus*.

The substituted carbanilides of the present invention are prepared by the reaction of substantially equimolar amounts of a chlorinated aromatic isocyanate having the position ortho to the —NCO group unsubstituted and a polyfluoralkoxy aniline having the position ortho to the —NH₂ group unsubstituted.

The reaction of the isocyanate and aniline reactants is conducted in the presence of an inert solvent at a temperature of about 20°C. to below the reflux temperature of the reaction generally about 20° to 100°C. Suitable solvents for the reaction include benzene, toluene, ethyl ether, dioxane and acetonitrile. The time period to effect the reaction generally ranges from about 1 hour to about 60 hours.

Depending on the concentration of the reacting solution, the compounds are obtained as precipitate, which can be filtered or they may remain in solution. In this case it is recommended to remove the solvent by distillation at reduced pressure. The remaining product is purified by crystallization from suitable solvents, which, for instance, include alcohols, dilute alcohols, benzene, toluene, hexane, heptane, cyclohexane, etc., and certain miscible combinations of the aforesaid solvents.

The products of this invention are colorless or nearly colorless solids readily soluble in acetone, other ketones and dimethylformamide.

PREFERRED EMBODIMENTS

Representative examples of substituted carbanilides within the scope of the present invention include the following:

3,4-dichloro-3'(1,1,2,2-tetrafluoroethoxy)carbanilide
3-chloro-3'-(1,1,2,2-tetrafluoroethoxy)carbanilide
4-chloro-3'-(1,1,2,2-tetrafluoroethoxy)carbanilide
3,4-dichloro-4'-(trifluoromethoxy)carbanilide
4-chloro-4'-(trifluoromethoxy)carbanilide
3-chloro-4'-(trifluoromethoxy)carbanilide The substituted carbanilides of the present invention can be used as antimicrobial agents alone in powders, solutions, aerosols, fabrics, plastics, paints, polymers, cosmetics and the like. Since they retain their activity without any loss in the presence of soap or other surfactants, they are especially suitable for utilization in toilet soaps, shampoos, soaps for surgical or medical use, cosmetic soaps, household and industrial cleaners, laundry detergents and like products.

In addition to soap, the substituted carbanilides exhibit high bacteriostatic activity in a wide variety of capillary or surface active agents. Such materials include salts of sulfated alcohols such as sodium lauryl sulfate, for example; salts of sulfated and sulfonated alkyl acids amides ("Igepon T"); salts of alkylaryl sulfonates, e.g. sodium dodecylbenzene sulfonate; alkylnapthalenesulfonic acids and their salts ("Nekal"); salts of sulfonated alkylaryl polyether alcohols (Triton 720); and many other products, detergents and emulsifiers known to the art whether of the aninonic, cationic, nonionic or amphoteric types of surface active agents. A more complete description of many of the materials included in the class of capillary active and surface active agents referred to above may be found in Encyclopedia of Surface-Active Agents, I. P. Sisley, Chemical Publishing Co., Inc., New York, New York, and Surface Active Agents, A. M. Schwartz and I. W. Perry, Interscience Publishers, Inc., New York, New York.

As is well known, many of the available bacteriostatic agents, notably those of the quaternary ammonium salt type, are inactivated in the presence of capillary-active or surface active agents such as soaps and detergents. The bacteriostatic activity of the substituted carbanilides of the present invention, however, as a general rule, is not substantially reduced by a wide variety of surface-active substances, and in some cases is even improved. For this reason, the substituted carbanilides are especially useful in combination with such capillary-active materials.

As other examples of particular applications of the substituted carbanilides of this invention, their use with dry powdered carriers such as starch or talcum, with or without medicants, is noted. Incorporation into pressed solids may also be effected, if desired. Solutions of the substituted carbanilides of this invention in suitable solvents may be incorporated into cosmetic compositions in stick, paste, jelly, cream, lotion, roll-on, spray aerosol or other forms. The compounds of this invention can also be finely milled and incorporated into ointments by conventional techniques to render the ointments antibacterial. In addition, solutions or dispersions of the substituted carbanilides may be also used for cleaning medical instruments, food processing equipment, or any other surface upon which it is desired to control bacteria.

Relatively small amounts of the substituted carbanilides may be used in the antibacterial compositions described above, including soaps and other surface-active or detergent compositions, which may be considered to be typical as to concentration levels. Amounts as low as 0.1 to 1%, based upon the total weight of the composition may be employed although a range of about 1 to 3% is usually preferred. Amounts less than about 0.1% are generally of little value since they generally do not produce a useful degree of activity. Although 5% or more may be used, the upper limit of the amount os substituted carbanilide which may be used is determined by practical considerations. As a general rule, increasing the concentration of the substituted carbanilide in the composition increases the germicidal activity of the resulting product. However, the cost of the agent relative to the cost of the product itself mitigates against the use of too large an amount of the agent. However, large amounts of the agent are to be avoided if such use would adversely affect the properties of the product.

With respect to soap, the invention may be practiced by adding the agents to the soap in any suitable manner during the crushing or milling or similar operation. Care should be taken to obtain a uniform distribution of the substituted carbanilide throughout the soap. They may be dissolved in a small amount of a suitable solvent or may be dispersed or wetted with a suitable dispersing or wetting agent before incorporation into soap. In general, any method which results in the agent being uniformly incorporated into the final soap product is satisfactory.

The substituted carbanilide compounds, as noted above, can also be incorporated in similar concentrations in cosmetic formulations and detergent compositions other than soaps, according to known techniques fully familiar to those skilled in the art. The substituted carbanilides of the present invention are also suitable for use in aerosols applied to animate or inanimate surfaces or for air disinfection.

A similar range of toal concentration of bacteriostats can also be employed for mixtures of the carbanilides with other bacteriostats, as for instance, bacteriostatic phenols, bisphenols, salicylanilides or any other bacteriostat or bactericide.

The following examples will further illustrate the invention.

EXAMPLE I

Preparation of 3,4-dichloro-3'(1,1,2,2,-tetrafluorethoxy)-carbanilide

To a flask equipped with a sealed stirrer, reflux condenser, thermometer and dropping funnel were charged 6.3 g. 3-(1,1,2,2,-tetrafluoroethoxy) aniline dissolved in 75 ml. dry toluene and 5.6 g. 3,4-dichlorophenyl isocyanate. The contents of the flask were agitated for 24 hours at 23°C. A white precipitate formed during this period. The toluene was removed by distillation at reduced pressure. Recrystallization of the residue from a mixture of 200 ml. hexane and 30 ml. isopropanol for 20 hours at −10°C. yielded 5.4g. of a white solid having a melting point of 164°–166°C. and a chlorine, fluorine, nitrogen analysis as follows:

|  | Calculated for $C_{15}H_{10}Cl_2F_4N_2O_2$ | Found |
|---|---|---|
| % Cl | 17.85 | 17.48 |
| % F | 19.15 | 19.36 |
| % N | 7.05 | 7.38 |

EXAMPLE II

Preparation of 3-chloro-3'-(1,1,2,2-tetrafluoroethoxy)-carbanilide.

The procedure of Example I was repeated with the exception that the following reactants and reaction conditions were used:

Reactants 6.3 g. 3-(1,1,2,2-tetrafluoroethoxy) aniline in 70 ml. toluene.

4.6 g. m-chlorophenyl isocyanate.

Reaction Conditions 24 hr. agitation at 23°C. followed by 2 hour agitation at 80°C.

Recrystallization of the crude product from a mixture of 75 ml. hexane and 140 ml. toluene yielded 8.5 g. of a white solid having a melting point of 136.5°–138.5°C. and a chlorine and nitrogen analysis as follows:

|  | Calculated for $C_{15}H_{11}Cl\ F_4N_2O_2$ | Found |
|---|---|---|
| % Cl | 9.80 | 9.68 |
| % N | 7.73 | 7.8 |

EXAMPLE III

Preparation of 4-chloro-3'-(1,1,2,2-tetrafluoroethoxy) carbanilide

The procedure of Example II was repeated with the exception that the reactants were 3.1 g. 3-(1,1,2,2tetrafluoroethoxy) aniline in 60 ml. toluene and 2.3 g. p-chlorophenyl isocyanate.

Recrystallization of the crude product from a 75 ml/20 ml toluene/alcohol blend yielded 2.3 g. of a white solid having a melting point of 196°–198.5°C. and a chlorine, nitrogen analysis as follows:

|  | Calculated for $C_{15}H_{11}Cl\ F_4N_2O_2$ | Found |
|---|---|---|
| % Cl | 9.82 | 9.56 |
| % N | 7.75 | 7.76 |

EXAMPLE IV

Preparation of 3,4-dichloro-4'-(trifluoromethoxy) carbanilide

The procedure of Example III was repeated with the exception that 1.1 g. p-aminophenyl trifluoromethyl ether (4-[trifluoromethoxy] aniline), 1.17 g. 3,4-dichlorophenyl isocyanate and toluene were used as reactants.

Recrystallization of the crude product from 115 ml. toluene yielded 1.8 g. of a white solid having a melting point of 210°–211.5°C. and a chlorine, nitrogen analysis as follows:

|  | Calculated for $C_{14}H_9Cl_2F_3N_2O_2$ | Found |
|---|---|---|
| % Cl | 19.41 | 19.16 |
| % N | 7.69 | 7.69 |

EXAMPLE V

Preparation of 4-chloro-4'-(trifluoromethoxy) carbanilide

The procedure of Example II was repeated with the exception that 1.4 g. 4-(trifluoromethoxy) aniline, 1.23 g. p-chlorophenyl isocyanate and 60 ml. toluene were used as the reactants.

Recrystallization of the crude product from a 100 ml. toluene/10 ml. alcohol blend yielded 2.0 g. of a white solid having a melting point of 236°–238°C. and a chlorine, nitrogen analysis as follows:

|  | Calculated for $C_{14}H_{10}Cl\,F_3N_2O_2$ | Found |
|---|---|---|
| % Cl | 10.75 | 10.40 |
| % N | 8.49 | 8.55 |

EXAMPLE VI

Preparation of 3-chloro-4'(trifluoromethoxy) carbanilide

The procedure of Example V was repeated with the exception that m-chlorophenyl isocyanate was used instead of p-chlorophenyl isocyanate.

Recrystallization of the crude product from a 70 ml. toluene/5ml. alcohol blend and then from a 50 ml. toluene/0.6 ml. alcohol blend yielded 1.3 g. of a white solid having a melting point of 179°–181°C. and a chlorine nitrogen analysis as follows:

|  | Calculated for $C_{14}H_{10}ClF_3N_2O_2$ | Found |
|---|---|---|
| % Cl | 10.75 | 10.56 |
| % N | 8.49 | 8.54 |

EXAMPLE VII

The anti-bacterial properties of the compounds prepared in Examples I–VI were tested in soap. The in vitro soap bacteriostatic tests were conducted as follows: The compound is dissolved in a suitable solvent, usually dimethylformamide, to give a 6% solution. One-half ml. aliquot was added to 100 ml. of 3% solution of bar soap stock solution. The solid soap used was a neutral white toilet soap of the "Lux" type. The fatty acids in this soap were of the following composition:

|  | Percent |
|---|---|
| Oleic and Linoleic acids | About 45 |
| Palmitic acid | About 10 |
| Lower fatty acids (lauric, etc.) | About 15 |
| Stearic acid | About 30 |

This yields an aqueous soap solution containing 30,000 mcg./ml. soap and 300 mcg./ml. compound. The soap/compound ratio in the latter is 100/1. A twofold serial dilution series is prepared with this solution using sterile distilled water in test tubes such that the final volume in each tube is 2.0 ml. To each test tube is added 28 ml. of molten Dextrose Trypticase Extract Agar (B.B.L.). The tube contents were poured into sterile Petri plates and allowed to harden. The highest final concentration of compound in the serial dilution series is 20 mcg/ml. Plates were spot innoculated with a broth culture of Staphylococcus aureus and incubated at 35° for 48 hours. The lowest concentration completely inhibiting growth of the test organism, in mcg./ml. is recorded as the bacteriostatic concentration of the compound. Tests in the absence of soap are made in a similar manner except that all dilutions are made in solvent. The final concentration in the agar should not be greater than 5%.

The results of these tests with the compounds of Examples I–VI are set forth in the Table below. Column 1 contains the data as to the activity of the test solution without soap; Column 2 refers to tests in which the ratio of soap to compound is 100:1. In both cases the numbers mean minimum concentration range (mcg./ml.) where S. aureus growth is completely inhibited.

TABLE

| Compound of Example No. | Minimum inhibitory concentration range (mcg/ml) | |
|---|---|---|
|  | 1 | 2 |
| I | 0.078 – 0.039 | 0.078 – 0.039 |
| II | 0.625 – 0.312 | 0.156 – 0.078 |
| III | >20* | 0.312 – 0.156 |
| IV | <0.078 | <0.078 |
| V | >20* | 0.312 – 0.156 |
| VI | 0.312 – 0.156 | 0.156 – 0.078 |

*The apparent lack of bacteriostatic activity is probably caused by a solubility problem which is frequently encountered with carbanilides.

EXAMPLE VIII

The following is illustrative of typical soap formulations which can be prepared using the substituted carbanilides of the present invention:

A. Two parts of finely ground substituted carbanilide of the present invention are blended well with 98 parts of soda soap filings. The blend is then milled thoroughly and pressed into molds. The soda soap may be of the "Lux" type described above or any other suitable bar soap stock.

B. One part of any one of the finely ground bacteriostatic substituted carbanilide compounds of this invention is carefully blended with one part of 3,4,4'-trichlorocarbanilide or with one part of hexachlorophene or with one part of dibromosalicylanilide, or one part of tri-bromosalicylanilide, or one part of a mixture of the latter two (Diaphene). This mixture is intimately milled with 98 parts of soda soap filings as above and pressed into molds.

What is claimed is:

1. A polyfluoralkoxy carbanilide compound of the structure

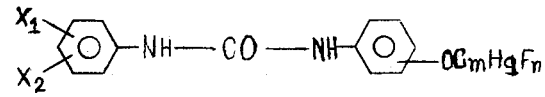

where $X_1$ and $X_2$ are selected from the group consisting of Cl and H, at least one of $X_1$ and $X_2$ being Cl, $m$ is an integer from 1 to 3, $q$ is an integer from 0 to 5, $n$ is an integer from 2 to 7 and the positions ortho to the nitrogen atom in the phenyl moieties are unsubstituted.

2. 3,4-dichloro-3'(1,1,2,2-tetrafluoroethoxy) carbanilide.
3. 3-chloro-3'-(1,1,2,2-tetrafluoroethoxy) carbanilide.
4. 4-chloro-3'-(1,1,2,2-tetrafluoroethoxy) carbanilide.
5. 3,4-dichloro-4'-(trifluoromethoxy) carbanilide.
6. 4-chloro-4'-(trifluoromethoxy) carbanilide.
7. 3-chloro-4'-(trifluoromethoxy) carbanilide.

* * * * *

UNITED STATES PATENT OFFICE
CERTIFICATE OF CORRECTION

Patent No. 3,860,645        Dated January 14, 1975

Inventor(s) Edward Nikawitz

It is certified that error appears in the above-identified patent and that said Letters Patent are hereby corrected as shown below:

Column 1, line 63, "3,4-dichloro-3'(1,1,2,-tetrafluoroethoxy) carbanilide" should read -- 3,4-dichloro-3-(1,1,2,2-tetrafluoroethoxy)carbanilide --. Column 3, line 2, "amount os" should read -- amount of --; line 45, 3,4,-dichloro-3'(1,1,2,2, tetrafluorethoxy)-carbanilide" should read -- 3,4-dichloro-3-(1,1,2,2,-tetrafluorethoxy)-carbanilide --. Column 6, line 65, "Cl and H and Cl,m" should read -- Cl and Cl,m --.

Signed and sealed this 1st day of July 1975.

(SEAL)
Attest:

RUTH C. MASON
Attesting Officer

C. MARSHALL DANN
Commissioner of Patents
and Trademarks